(12) United States Patent
Katsir et al.

(10) Patent No.: US 7,404,887 B2
(45) Date of Patent: Jul. 29, 2008

(54) ELECTRODES FOR ELECTROLYTIC CAPACITORS AND METHOD FOR PRODUCING THEM

(75) Inventors: Dina Katsir, Beer Sheva (IL); Uri Zarnitsky, Ashdod (IL)

(73) Assignee: ACKTAR, Ltd., Kiryat Gat (IL)

( * ) Notice: Subject to any disclaimer, the term of this patent is extended or adjusted under 35 U.S.C. 154(b) by 597 days.

(21) Appl. No.: 10/730,537

(22) Filed: Dec. 5, 2003

(65) Prior Publication Data

US 2004/0168929 A1    Sep. 2, 2004

(30) Foreign Application Priority Data

Dec. 5, 2002    (IL)    .................................... 153289

(51) Int. Cl.
*C25D 11/04*    (2006.01)

(52) U.S. Cl. ..................................... 205/324

(58) Field of Classification Search ................ 205/174, 205/186, 189
See application file for complete search history.

(56) References Cited

U.S. PATENT DOCUMENTS

| | | | | |
|---|---|---|---|---|
| 2,989,447 A * | 6/1961 | Power | ........................ | 205/171 |
| 3,203,793 A * | 8/1965 | Hand | ........................ | 428/613 |
| 3,331,993 A * | 7/1967 | Brown et al. | ................. | 361/511 |
| 4,309,810 A | 1/1982 | Drake | ........................ | 29/570 |
| 4,420,367 A | 12/1983 | Locher | | |
| 4,537,665 A | 8/1985 | Nguyen et al. | ................. | 204/29 |
| 4,888,666 A * | 12/1989 | Naitoh et al. | ................ | 361/512 |
| 4,942,501 A * | 7/1990 | MacFarlane et al. | ........ | 361/523 |
| 5,382,347 A * | 1/1995 | Yahalom | ...................... | 205/50 |
| 5,733,661 A * | 3/1998 | Ue et al. | ...................... | 428/426 |
| 6,168,706 B1 | 1/2001 | Hemphill et al. | ............ | 205/675 |
| 6,197,184 B1 | 3/2001 | Hemphill et al. | | |
| 6,224,738 B1 | 5/2001 | Sudduth et al. | | |
| 6,287,673 B1 | 9/2001 | Katsir et al. | ................. | 428/210 |
| 6,475,368 B2 * | 11/2002 | Harrington et al. | .......... | 205/118 |
| 2002/0149902 A1 | 10/2002 | Yamazaki et al. | ........... | 361/509 |

FOREIGN PATENT DOCUMENTS

EP    1 045 409 A2    10/2000

OTHER PUBLICATIONS

Patent Abstracts of Japan. vol. 017, No. 340 (E-1389), Jun. 28, 1993. Abstract of JP 05 047609 A, Feb. 26, 1993.

* cited by examiner

*Primary Examiner*—John P. Sheehan
*Assistant Examiner*—Jessee Roe
(74) *Attorney, Agent, or Firm*—Mayer & Williams PC; Karin L. Williams, Esq.

(57) ABSTRACT

In an anodized electrode which comprises a substrate, a vacuum deposited porous coating thereon comprising at least one substance selected from valve metals, valve metal oxides and mixtures thereof, and at least one ectrolytically produced anodized layer selected from valve metal oxides and mixtures thereof, the effective surface area is increased prior to deposition of the at least one anodized layer, e.g. by oxidizing the surface of the porous layer and removing thus formed oxide, and/or by roughening the surface of substrate mechanically, chemically and/or electrochemically, prior to vapor deposition.

13 Claims, 4 Drawing Sheets

ELECTRODES FOR ELECTROLYTIC CAPACITORS AND METHOD FOR PRODUCING THEM

FIELD AND BACKGROUND OF THE INVENTION

The present invention relates to electrodes for electrolytic capacitors and, to a method for producing such electrodes, particularly anodes but also cathodes, having increased effective surface area. The invention moreover relates to anodized electrodes which comprise non-cylindrical pores having a branched morphology.

Electrolytic capacitors are elementary electrical devices, intended to accumulate a static electric charge on their plates. One plate is metallic and the other plate is an electrolyte. Intervening between the two plates is a dielectric consisting of a surface oxide coating on the metal plate. Conventionally, the metal plate on which the dielectric coating is formed is referred to as the anode. The term "anode" is used herein to refer both to the metal plate itself and to the combination of the metal plate with the dielectric coating. It will be clear from the context which meaning of "anode" is intended.

To increase substantially the surface area of a metal electrode, and consequently the value of its specific capacitance, the etching process is carried out electrolytically with a chloride solution which dissolves metal and increases the surface area of the foil, forming a dense network like innumerable microscopic channels (pits). See for example U.S. Pat. No. 4,537,665 (Nguyen, et al.) which describes the manufacture of low-voltage aluminum foil electrolytic capacitor electrodes including etching the foil, cleaning and anodizing it, the cleaned foil being thermally treated at about 595-650° C., and then anodizing the treated foil in an adipate electrolyte.

In other prior etching technologies, the etching solutions typically contain Cl⁻ ions, see e.g. U.S. Pat. No. 6,168,706 (Hemphill, et al.), which employs hydrated $AlCl_3$, HCl, $H_2SO_4$ and $HClO_4$ or $ClO_4^-$. It is believed, however, that the presence of halogens in etching solutions is liable to cause serious ecological problems, complex and high cost disposal and in addition inhibit anodization.

In US 20020149902 A1, published Oct. 17, 2002, there is described an electrode foil for an aluminum electrolytic capacitor, comprising a plurality of main pits formed by etching on both surfaces of an aluminum foil to extend from the surfaces in a thickness direction of the foil, and sub pits branched away from the main pits and along the length of the main pits, as well as a multi-step etching procedure for creating and enlarging both main pits and sub pits. In practice, the main pits are vertical and have a uniform and apparently cylindrical cross section, while the sub-pits are formed perpendicularly to the longitudinal axis of the main pits and appear also to have a uniform and apparently cylindrical cross section. Use in this procedure of chlorine-containing etchants necessitated a dechlorination step.

To overcome such disadvantages and also to reduce capacitor size by using thinner Al foil recently, vacuum deposition has been proposed for increasing the surface area of foil electrodes. Thus, e.g., Drake, in U.S. Pat. No. 4,309,810, teaches vacuum deposition of a metal vapor at a low angle onto a foil substrate, and presents an example of the deposition of aluminum on aluminum to give a columnar structure. However, Drake's foil has been found to be too brittle for use in electrolytic capacitors, because the columns break when the foil is rolled into a cylindrical roll, one of the standard procedures in the manufacture of electrolytic capacitors.

Another method of electrode manufacture by an improved vacuum deposition method, providing high surface area values, has been described by Katsir et al., in U.S. Pat. No. 6,287,673. This method utilizes condensation of metal vapor on a thin conducting substrate in an atmosphere of low-pressure inert gas/oxygen mixture, so as to produce a porous coating structure having a high surface area. Aluminum is generally a suitable material to be selected from the family of valve metals, due to its high electrical conductivity, low cost of high-purity aluminum foil and bulk metal, good dielectric properties of alumina, and other technological advantages. The required oxide film is produced by electrolytially anodizing the obtained coating, by DC current in a nonsolving or weakly solving electrolyte, such as the ammonium salts of boric, citric, oxalic and adipic acids or mixtures thereof.

The process of anodizing foils is accompanied, unavoidably, by gradual filling of its pores by oxide due to increasing thickness of the alumina layer, and of course filled pores do not contribute positively to the surface area. It is clear that the width and depth of pores are critical parameters of the obtained coating. If the initial sizes of trench-like pores are not large enough, the process of filling the pores during anodization leads to rapidly decreasing capacitance of the desired electrodes. On the other hand, the capacitance also decreases if the pore size is too large. For anode foils, it is necessary that pore diameter is substantially larger than the thickness of the dielectric coating (e.g. $Al_2O_3$) made by the anodization voltage. By way of example, a simplified estimation for $Al_2O_3$ thickness for 60 V forming voltage, i.e. the final voltage, is as follows: the $Al_2O_3$ thickness will be 14 Å per volt×60 volt=840 Å. Thus, it is necessary that—in this illustration—pore diameter will be larger than 840 Å (×2), and pore sizes with a smaller diameter will not contribute to the capacitance because the pores will be filled up by $Al_2O_3$. As the thickness of the dielectric layer increases, the capacitance decreases, but with a consequent increase in the working voltage of the capacitor.

Vacuum deposition methods per se are limited in their ability to create large pores. Therefore, high capacitance can be obtained only for an extremely low-voltage range using such known methods.

It would thus be desirable to provide a method free from the usage of Cl for manufacturing electrolytic capacitor electrodes and to obtain (for example) anode foils for aluminum electrolytic capacitors with increased values of specific capacity, suitable for a broader in-use voltage range up to and more than 100 volts.

It is accordingly an object of the invention to provide electrolytic capacitor electrodes based on vacuum deposition techniques, but with increased values of specific capacity, and a method for making such electrodes.

Other objects of the invention will appear from the description which follows.

The entire contents of the above-mentioned U.S. Patents and published U.S. Patent Application are incorporated by reference herein.

SUMMARY OF THE INVENTION

The present invention accordingly provides in one aspect, method for preparing an anodized electrode comprising the sequential steps of:
 (1) providing a substrate;
 (2) coating the surface of the substrate by vacuum deposition thereon of a porous coating comprising at least one substance selected from valve metals, valve metal oxides and mixtures thereof;

(3) increasing the effective surface area of the porous coating; and (4) producing electrolytically at least one anodized valve oxide layer overlaying the surface of the porous coating.

Moreover, the present invention provides in another aspect, a method for preparing an anodized electrode which includes pores having a branched morphology, comprising the sequential steps of:

(1) providing a metallic foil substrate;

(2) coating the surface of the substrate by vacuum deposition thereon of aluminum vapor in presence of a minor amount of oxygen such that a porous layer, consisting essentially of an aluminum metal component and an aluminum oxide component, is deposited on the substrate;

(3) increasing the effective surface area of the porous coating by electrolytic anodization in presence of an electrolyte which comprises a saturated dicarboxylic acid salt selected from the ammonium and alkali metal salts, and removing thus-formed valve metal oxide(s), as well as at least part of the aluminum oxide component, by use of a halogen-free chemical etchant in situ or in a discrete subsequent sub-step; and (4) producing electrolytically at least one anodized aluminum oxide layer overlaying the surface of the porous coating.

In still another aspect, the invention provides an anodized electrode comprising:

a substrate;

a porous coating on the surface of the substrate produced by vacuum deposition thereon, the porous coating comprising at least one substance selected from valve metals, valve metal oxides and mixtures thereof; and at least one electrolytically produced anodized layer selected from valve metal oxides and mixtures thereof;

wherein in the porous coating, the effective surface area has been increased prior to deposition of the at least one anodized layer.

In the method(s) of the invention, the effective surface area increase of the porous coating may be achieved by increasing the total pore volume of the porous coating, and/or by increasing the average pore width in the porous coating. The term "average pore width" means the average pore width at the surface of the vapor deposited coating.

Furthermore, the invention provides in yet another aspect, an anodized electrode which comprises non-cylindrical pores having a branched morphology, and in particular, wherein at least some of the pores are generally configured as inverted cones.

It has been found that the present invention (as compared with non-etching) is capable of achieving an increase in the specific capacitance of manufactured foils, of substantially 100% or more, especially for relatively large values of forming voltage in a range from 40 up to 80 volts.

DETAILED DESCRIPTION OF THE INVENTION

Figure 1:
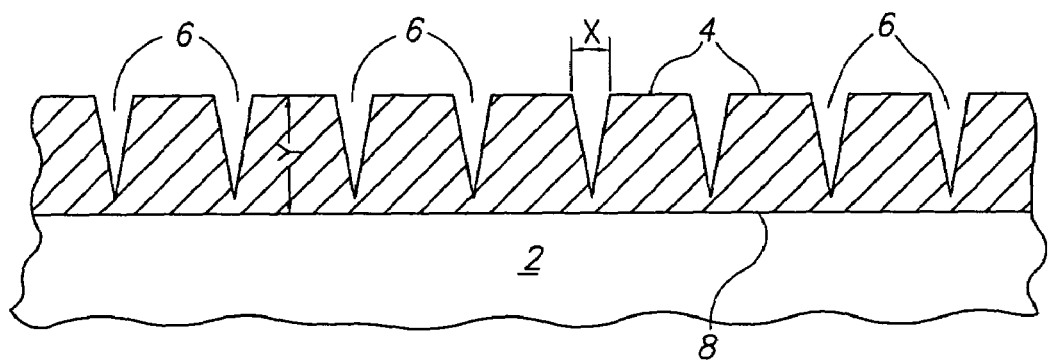
FIG. 1 shows schematically in section, a foil substrate on which there has been vapor deposited (VD), illustratively, a layer of Al and/or Al oxide.

The anodized electrode of the present invention is preferably further characterized by at least one of the following features:

(a) the electrically conductive substrate is a metallic foil substrate;

(b) the initial layer comprises at least one member selected from aluminum, aluminum oxide and mixtures thereof;

(c) the initial layer is a vapor deposited layer;

(d) the final layer or layers comprise(s) aluminum oxide;

(e) the pore volume enlargement has been effected by oxidizing the surface of the initial layer and removing thus-formed valve metal oxide(s).

Also, in the method(s) of the invention, it is preferable that at least one of the following conditions applies:

(a) the substrate is an electrically conductive substrate;

(b) the porous coating comprises at least one member selected from aluminum, aluminum oxide and mixtures thereof;

(c) the at least one electrolytically produced layer comprises aluminum oxide;

(d) the effective surface area increase has been implemented by at least one procedure selected from:

electrochemical etching, and oxidizing the surface of the porous layer followed by removal of thus formed oxide;

(e) prior to deposition of the porous coating, the surface of the substrate has been subjected to a roughening procedure selected from mechanical, chemical and electrochemical procedures;

(f) the vacuum deposition is carried out in an inert gas atmosphere at a pressure of between about $10^{-3}$ Torr. and about $10^{-2}$ Torr;

(g) the vacuum deposition is carried out in an inert gas atmosphere in presence of a minor amount of oxygen;

(h) following step (4), the product is thoroughly rinsed with a liquid selected from distilled and de-ionized water, and then dried.

In the method(s) of the invention described above in the section titled "SUMMARY OF THE INVENTION," the pore volume enlarging step (3) is preferably effected by electrolytic anodization in presence of an electrolyte which comprises a saturated dicarboxylic acid salt (e.g. an adipate) selected from the ammonium and alkali metal salts. Thus-formed valve metal oxide(s) are preferably removed by use of a halogen-free chemical etchant (selected, e.g., from inorganic and organic acids), either in situ or in a discrete subsequent sub-step. Moreover, following step (3), the substrate having the thus-enlarged pore volume is desirably thoroughly rinsed with a liquid selected from distilled and deionized water, before proceeding to step (4).

In a particular embodiment, step (4) is carried out by depositing at least two electrolytically deposited layers, e.g. by effecting at least two successive anodization steps, and the product is preferably subjected to annealing prior to the last of the successive anodization steps. It is preferable also for the product to be thoroughly rinsed with a liquid selected from distilled and deionized water, prior to annealing. Moreover, it is also desirable for the product to be thoroughly rinsed with a liquid selected from distilled and deionized water, and then dried, following the last of the successive anodization steps.

From what has been stated above, and without prejudice to the scope of the invention as defined herein, it will be appreciated that the valve metal(s) preferably comprise(s) aluminum.

In a particular embodiment of the invention, vacuum deposition conditions are such—when using aluminum in presence of oxygen—that the porous layer prior to step (3) consists essentially of at least 40% (preferably 50-85%) aluminum metal, balance aluminum oxide.

The mentioned chemical etchant is preferably selected from chromic, oxalic and phosphoric acid, and mixtures thereof.

FIG. 1 shows schematically in section, a vapor deposited (VD) layer (4) of e.g. Al and/or Al oxide, which has been deposited on a surface (8) of an Al foil substrate (2). The VD layer includes possibly trench-like pores (6) having, for illustrative purposes, a triangular section, and which have maximum width x and height y.

Figure 2:
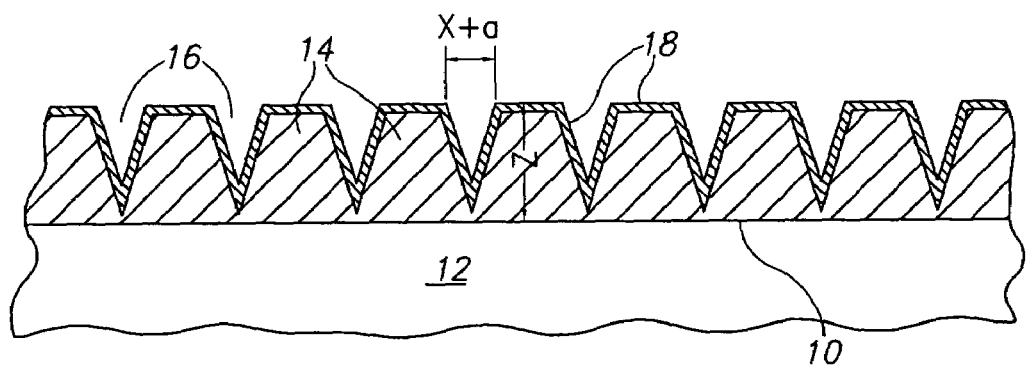
FIG. 2 shows schematically in section, an embodiment of the invention as applied to the substrate +VD layer, depicted in FIG. 1.

FIG. 2 shows schematically in section, the result of applying the present invention to the VD layer of FIG. 1, i.e., increasing the pore volume. In the illustrated embodiment, this is done by removing, by chemical etching, an Al oxide layer which had been deposited by anodization, or in other words by electrochemically oxidizing and thus eroding the surface of the VD layer. As described elsewhere in the specification, following the etching step which removes initially produced Al oxide thus enlarging the pores, an anodized layer is then applied in one or more steps to the etched surface in order to obtain a final product. In FIG. 2, VD layer (14) has been deposited on an Al foil substrate (12) and the entire upper surface of the VD layer continuum including the pores (16) is covered by the final anodized layer 18. Resulting from application of the present method, pores 16 now have a greater width (x+a) than the original pores in the VD layer and a different depth z, since the etching procedure on the one hand removes surface metal, but on the other hand increases penetration of the pores, possibly even up to the interface 10 between substrate 12 and VD layer 14.

Figure 3:
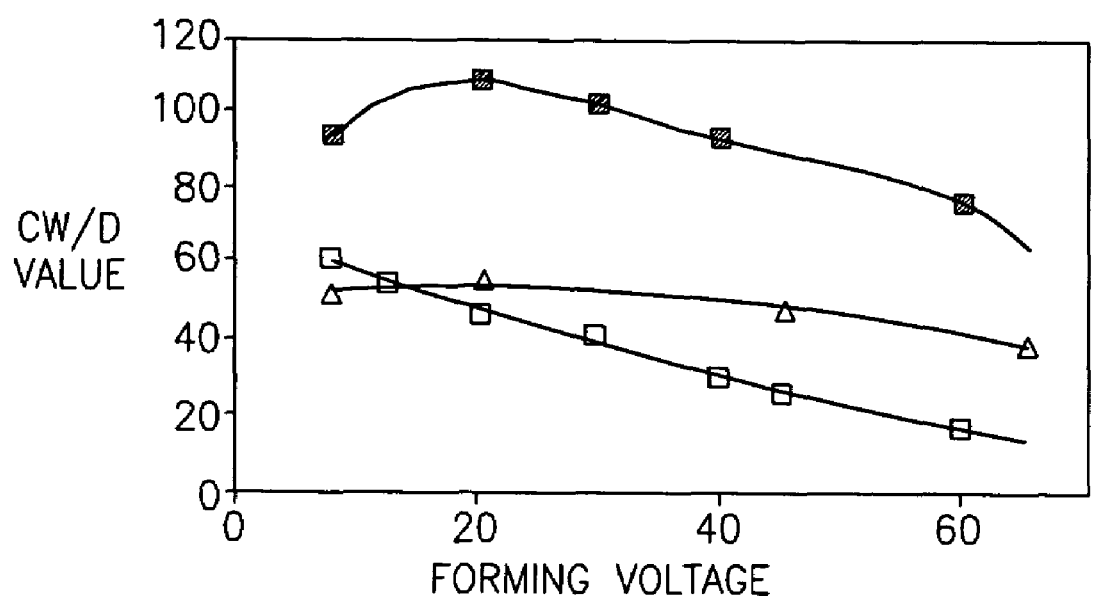
FIG. 3 is a graph which compares for three foils, a specific parameter ($\xi$) proportional to specific capacitance, in relation to the final anodization voltage.

Because the specific capacitance of the present electrode foils, $C(spec)=\mu F/cm^2$, is nearly proportional to the thickness of the VD coating D ($\mu M$) and inversely proportional to the anodized oxide film thickness $\delta$ (nm), the withstanding voltage W of the oxide layer is proportional to $\delta$, so that foil quality can be estimated by means of parameter $\xi = C(spec) W/D$. It may be assumed that the larger the values of parameter $\xi$, so these foils should have improved characteristics as capacitor electrodes. In FIG. 3, $\xi$ values have been plotted against the forming (i.e. the final anodization) voltage for three foils. The triangular points denote performance of anode foils produced by conventional etching processes carried out electrochemically with a chloride solution; the value of D having been assumed in this case to be equal to depth of the pores. The hollow rectangular points represent typical data for VD coated foil manufactured by vacuum deposition in accordance with Katsir et al., U.S. Pat. No. 6,287,673. The solid rectangular points represent data for an embodiment of the present invention prepared according to Example II herein. This figure shows a remarkable increase of $\xi$ for the present invention as compared with the prior art, over a wide range of forming voltages.

Figure 4:
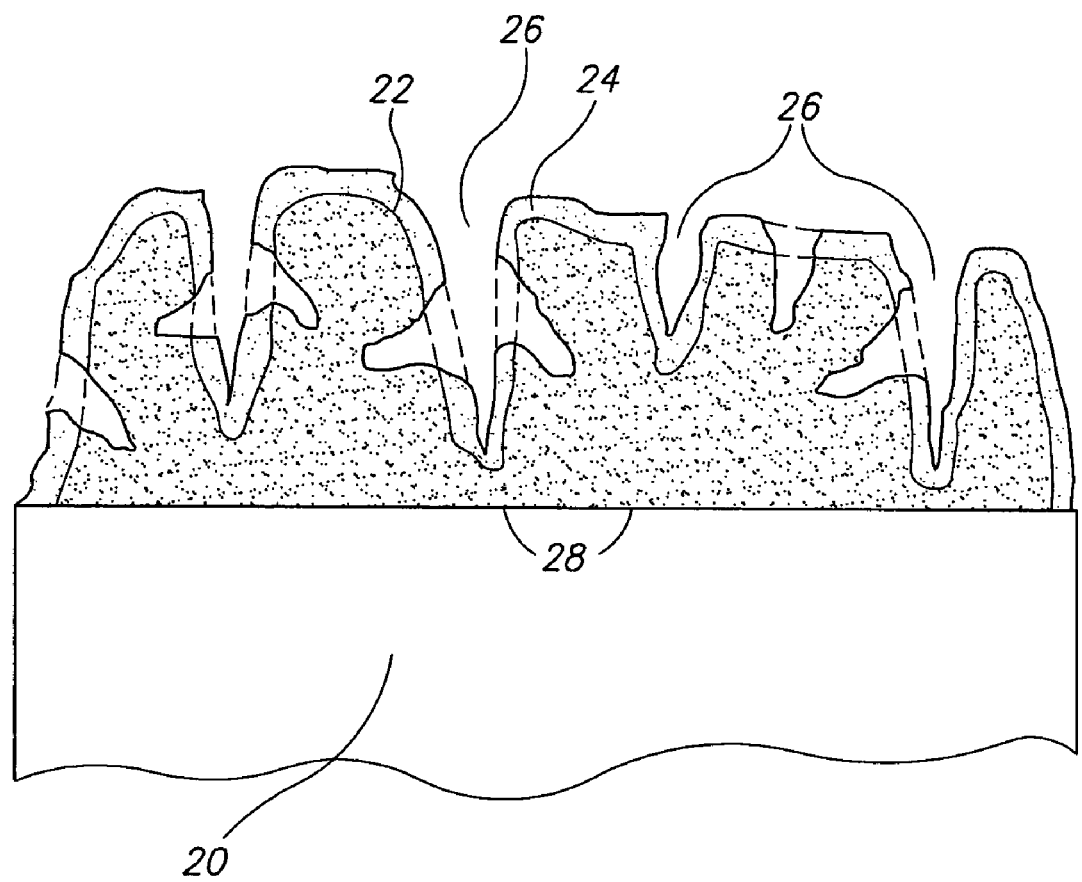
FIG. 4 shows schematically in section, an embodiment of the invention in which pores have a branched morphology.

In FIG. 4, illustrating an embodiment of the aspect of the invention in which the pores have a branched morphology, on substrate 20, there has been vapor deposited coating 22 containing illustrative pores 26. In the etching step, oxide in the vacuum deposited coating has been removed to form branches 28. Reference numeral 24 denotes residual surface oxide which remains after etching.

DESCRIPTION OF PRESENTLY PREFERRED EMBODIMENTS

The pore volume enlargement which is a feature of the present invention can be achieved in a number of ways.

A high-purity aluminum substrate, after reactive deposition of $Al/Al_2O_3$ in an inert gas atmosphere having a pressure of between about $10^{-3}$ Torr. and about $10^{-2}$ Torr., containing also a partial pressure of oxygen (see U.S. Pat. No. 6,287,673), is anodized by DC current at an initial current density of about $2A/dm^2$ in an aqueous solution of ammonium adipate, at a temperature of about 50° C., at a voltage up to the required in-use voltage. This process is stopped at a current density near 40 $mA/dm^2$. Thorough rinsing of the foil by deionized water is followed by chemical etching. This may be effected e.g., in an aqueous solution of a phosphoric/chromic acid mixture, for about 2-3 minutes at a solution temperature of about 40° C. In an alternative embodiment, which is more acceptable from an ecological point of view, etching is carried out using a carboxylic acid (such as oxalic acid) in aqueous solution 0.1M, at a temperature of 50-80° C., e.g. about 60° C., for 5-10 minutes, e.g. about 7 minutes. In yet another embodiment, initial anodization is carried out with aqueous carboxylic acid salt such as ammonium adipate, while etching is effected virtually simultaneously by the presence of 0.01M to 0.02M (e.g. 0.014 M) oxalic acid dissolved in the electrolytic bath, the operation being carried out at about 50° C. The anodized coating may be stabilized for 10 minutes after the current has been abruptly reduced. The preparation process may be completed by annealing at about 500° C. for about 2 minutes, and further anodizing for about 2 minutes under previously stated conditions.

The invention will be illustrated by the following non-limiting Examples.

EXAMPLE I

An anodized foil electrode is manufactured by the following stepwise procedure:

A high-purity aluminum foil substrate is subjected to reactive deposition of $Al/Al_2O_3$ in an inert gas atmosphere having a pressure of between about $10^{-3}$ Torr. and about $10^{-2}$ Torr., containing also a partial pressure of oxygen, as described in U.S. Pat. No. 6,287,673.

The product of step 1 is anodized by DC current at an initial current density of about 2 $A/dm^2$ in a 0.83M aqueous solution of ammonium adipate, at a temperature of about 85° C. Anodization is continued up to 10 minutes past current break out.

The product of step 2 is thoroughly rinsed with deionized water.

The product of step 3 is etched by immersion in an aqueous solution containing $H_3PO_4$ (35 g/l OF 80% acid) and chromic acid (20 g/l $CrO_3$), at 40° C. for 2.5 minutes.

The product of step 4 is anodized under the conditions of step 2.

The product of step 5 is thoroughly washed with deionized water.

The product of step 6 is annealed at about 500° C. in a flow of hot air, for about 2 minutes, and further anodized for about 2 minutes under previously stated conditions.

The product of step 7 is anodized under the conditions of step 2 for about 2 minutes.

The product of step 8 is thoroughly washed with deionized water, and dried in a flow of hot air.

In this Example, and in Examples II and III, it is to be understood that the procedure is carried out in a continuous manner by passage of Al foil in roll form from one step to the next step.

EXAMPLE II

Figure 5:
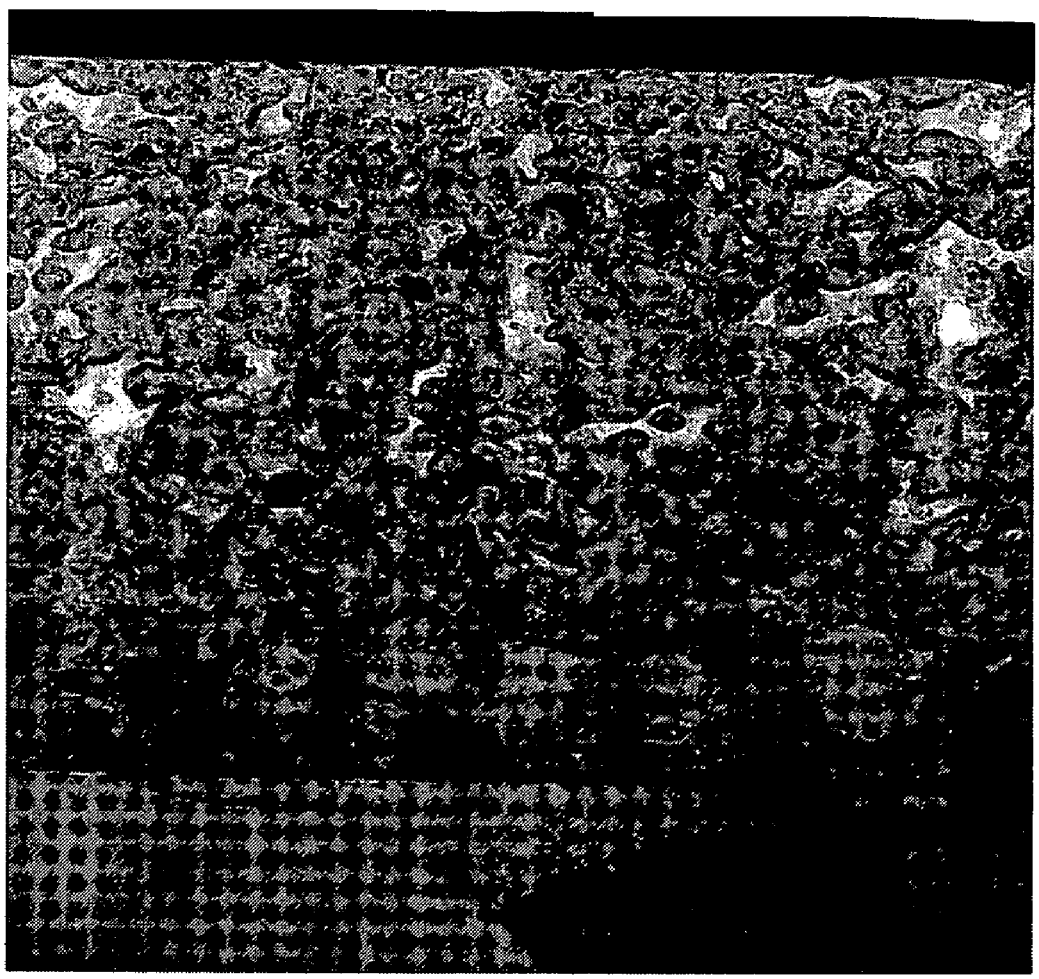
FIG. 5 is a micrograph of a cross-section of an anodized electrode in accordance with an embodiment of the invention.

This is carried out as in Example I, except that etching step 4 is carried out by immersion. The product of step 3 is etched by immersion in a 0.1M aqueous solution of oxalic acid at 60° C. for about 7 minutes. A cross-section of the resulting electrode is shown in the micrograph of FIG. 5.

EXAMPLE III

This is carried out as in Example I, except that steps 2-4 are replaced by the following procedure (virtually simultaneous initial anodization and etching). The product of step 1 is immersed in a single bath containing an aqueous solution which is 0.83M in respect of ammonium adipate and 0.14M in respect of oxalic acid. Current density, temperature and time of this operation are as stated in step 2 of Example I. The foil is thoroughly rinsed with deionized water, following which the operations described in steps 5-9 of Example I are carried out.

EXAMPLE IV

Determination of Pore Volume Enlargement

Method: Two identical samples of VD foils NN 464/1/11/1 and 464/1/11/2 based on an Al foil substrate of thickness 63 µm and whole area 12.38 $cm^2$, were coated on both sides by $Al/Al_2O_3$ of thickness 20 µm each side, as described in U.S. Pat. No. 6,287,673. The area of each coated surface was 11.91 $cm^2$. Both samples were formed (anodized) for 10 minutes in an ammonium adipate solution at forming voltage 21 volts, forming current 0.5 A, and electrolyte temperature 85° C. The area of samples, so anodized was 10 $cm^2$. The samples were then washed with deionized water, dried and weighed.

In order to compare pore volumes, the second sample prior to final anodization was etched in an oxalic acid solution 0.3M at 60° C. during 15 minutes, and then anodized, washed, dried and weighed, as above.

The samples were now immersed in heated oil (TKO-19+) at 100° C., with a specific gravity 0.87 $g/cm^3$. Excess oil was carefully removed, and both samples were weighed. It is believed that substantially all pores were filled entirely by the heated oil.

Calculations

The first (non-etched) foil sample was found to have absorbed 8.9 mg oil, i.e. 8.9/0.8-10.22 $mm^3$ oil, distributed on an area of 11.91 $cm^2$. Therefore the oil volume absorbed on the anodized area of the sample (10 $cm^2$) is 10.22×10/11.91-8.58 $mm^3$. Reduction of the pore volume caused by anodization is related to an estimated wall thickness difference of 15 nm, and is approximately 5.55 $mm^3$, so that the pore volume before anodization was equal to 5.55/8.58-14.13 $mm^3$. Because the volume or coating under treatment (for two sides of substrate) is approximately 40 $mm^3$, the degree of porosity of the initial sample is 100×14.13/40=35.3%.

Similar evaluation of the porosity of the second (etched and anodized) foil sample, which was found to have absorbed 19.65 $mm^3$ oil, affords an estimated 41.2% porosity.

Conclusion

In this exemplified embodiment of the present invention, the additional etching step almost doubled the pore volume and increased the degree of porosity of the sample about 20%.

While particular embodiments of the invention have been particularly described hereinabove, it will be appreciated that the present invention is not limited thereto, since as will be readily apparent to skilled persons, many modifications or variations can be made. Such modifications or variations which have not been detailed herein are deemed to be obvious equivalents of the present invention.

What is claimed is:

1. A method for preparing an anodized electrode comprising the sequential steps of:
   (1) providing a substrate;
   (2) coating the surface of the substrate by vacuum deposition thereon of a porous coating comprising at least one substance selected from valve metals, valve metal oxides and mixtures thereof;
   (3) increasing the effective surface area of said porous coating; and
   (4) producing electrolytically at least one anodized valve oxide layer overlaying the surface of said porous coating;
   and wherein said effective surface area increase of said porous coating is implemented by at least one of the following;
   increasing the total pore volume of said porous coating;
   increasing the average pore width in said porous coating.

2. A method according to claim 1, which is further characterized by at least one of the following features:
   (a) said substrate is an electrically conductive substrate;
   (b) said porous coating comprises at least one member selected from aluminum, aluminum oxide and mixtures thereof;
   (c) said at least one electrolytically produced layer comprises aluminum oxide;
   (d) said effective surface urea increase has been implemented by at least one procedure selected from:
      electrochemical etching, and
      oxidizing the surface of said porous coating followed by removal of thus formed oxide;
   (e) prior to deposition of said porous coating, the surface of said substrate has been subjected to a roughening procedure selected from mechanical, chemical and electrochemical procedures;
   (f) said vacuum deposition is carried out in an inert gas atmosphere at a pressure about $10^{-3}$ Torr. and about $10^{-2}$ Torr,
   (g) said vacuum deposition is carried out in an inert gas atmosphere in presence of a minor amount of oxygen;
   (h) following step (4), the product is thoroughly rinsed with a liquid selected from distilled and de-ionized water, and then dried.

3. A method according to claim 2, which is further characterized by at least one of the following features:
   (A) said electrically conductive substrate is a metallic foil substrate;
   (B) step (3) is implemented by electrolytic anodization and simultaneously or subsequently removing electrolytically formed valve metal oxide.

4. A method according to claim 3, wherein step (4) is carried out by forming a series of at least two anodized layers, provided that the product of said forming is subjected to annealing prior to forming the last anodized layer in said series.

5. A method according to claim 4, wherein the product of said forming is thoroughly rinsed with a liquid selected from distilled and de-ionized water, prior to said annealing.

6. A method according to claim 3, wherein said substrate is a metallic foil substrate: in step (2) said at least one valve metal comprises aluminum; in step (3) said increasing is implemented by oxidizing the surface of said vacuum deposited porous coating by anodization in presence of an electrolyte which comprises a saturated dicarboxylic acid salt selected from the ammonium and alkali metal salts, and removing thus-formed valve metal oxide(s) by use of a halogen-free chemical etchant in situ or in a discrete subsequent sub-step;

and in step (4) said at least one layer comprises aluminum oxide.

7. A method according to claim 6, wherein at least one of (he following features applies:

said vacuum deposition is carried out in an inert gas atmosphere at a pressure about $10^{-3}$ Torr. and about $10.2^{-2}$ Torr. in presence of a minor amount of oxygen;

said electrolyte comprises a salt selected from the ammonium and alkali metal adipates;

said chemical etchant is selected from chromic, oxalic and phosphoric acid, and mixtures thereof.

8. A method according to claim 6, wherein step (4) is carried out by forming a series of at least two anodized layers, provided that the product of said forming is subjected to annealing prior to forming the last anodized layer in said series.

9. A method according to claim 8, at least one of the following features applies:

said vacuum deposition is carried out in an inert gas atmosphere at a pressure about $10^{-3}$ Torr. and about $10^{31\ 2}$ Torr. in presence of a minor amount of oxygen;

said electrolyte comprises a salt selected from the ammonium and alkali metal adipates;

said chemical etchant is selected from chromic, oxalic and phosphoric acid, and mixtures thereof.

10. A method according to claim 3, wherein said substrate is a metallic foil substrate; in step (2) said at least one valve metal consists essentially of aluminum and said vapor deposition of claim 3, clause (g) is carried out such that said porous coating consists essentially of aluminum metal and aluminum oxide; in step (3) said increasing is implemented by oxidizing the surface of said porous coating by anodization in presence of an electrolyte which comprises a saturated dicarboxylic acid salt selected from the ammonium and alkali metal salts thereof, and removing thus-formed valve metal oxide(s) by use of a halogen-free chemical etchant in situ or in a discrete subsequent sub-step; and in step (4) said at least one layer comprises aluminum oxide.

11. A method according to claim 10, wherein step (4) is carried out by forming a series of at least two anodized layers, provided that the product of said forming is subjected to annealing prior to forming the last anodized layer in said series.

12. A method according to claim 10, wherein at least one of the following features applies:

said vacuum deposition is carried out in an inert gas atmosphere at a pressure about $10^{-3}$ Torr. and about $10^{-2}$ Torr.;

said vacuum deposition conditions arc such that said porous coating prior to step (3) consists essentially of at least 40% aluminum metal, balance aluminum oxide;

said electrolyte comprises a salt selected from the ammonium and alkali metal adipates;

said chemical etchant is selected from chromic, oxalic and phosphoric acid, and mixtures thereof.

13. A method according to claim 10, wherein at least one of the following features applies:

said vacuum deposition is carried out in an inert gas atmosphere at a pressure about $10^{-3}$ Torr. and about $10^{-2}$ Torr.;

said vacuum deposition conditions are such that said porous coating prior to step (3) consists essentially of 50-85% aluminum metal, balance aluminum oxide;

said electrolyte comprises a salt selected from the ammonium and alkali metal adipates;

said chemical etchant is selected from chromic, oxalic and phosphoric acid, and mixtures thereof.

\* \* \* \* \*